(12) United States Patent
Lim et al.

(10) Patent No.: US 9,629,177 B2
(45) Date of Patent: Apr. 18, 2017

(54) METHOD AND APPARATUS FOR TWO-WAY BROADCASTING

(75) Inventors: Yeon-Ju Lim, Gwanak-gu (KR);
Sung-Ryul Yun, Gyeonggi-do (KR);
Admir Burnic, Duisburg (DE);
Alexander Viebmann, Duisburg (DE);
Christian Kocks, Muelheim an der Ruhr (DE); Christoph Spiegel, Oberhausen (DE); Peter Jung, Duisburg (DE)

(73) Assignees: Samsung Electronics Co., Ltd (KR);
Peter Jung & Guido Bruck Institut Fur Kooperationstechnik GBR (DE)

( * ) Notice: Subject to any disclaimer, the term of this patent is extended or adjusted under 35 U.S.C. 154(b) by 131 days.

(21) Appl. No.: 12/718,595

(22) Filed: Mar. 5, 2010

(65) Prior Publication Data
US 2010/0226331 A1 Sep. 9, 2010

(30) Foreign Application Priority Data
Mar. 6, 2009 (KR) ......................... 10-2009-0019474

(51) Int. Cl.
*H04W 72/12* (2009.01)
*H04W 72/04* (2009.01)
(Continued)

(52) U.S. Cl.
CPC ....... *H04W 72/1289* (2013.01); *H04L 1/0026* (2013.01); *H04L 1/1671* (2013.01);
(Continued)

(58) Field of Classification Search
USPC ........................................................ 370/329
See application file for complete search history.

(56) References Cited

U.S. PATENT DOCUMENTS 6,393,047 B1 * 5/2002 Popovic' ...................... 375/140
2002/0105976 A1 * 8/2002 Kelly et al. ................... 370/519
(Continued)

FOREIGN PATENT DOCUMENTS

WO   WO 2008-004629   1/2008

OTHER PUBLICATIONS

DVB Document A122, "Frame structure channel coding and modulation for a second generation digital terrestrial television broadcasting system (DVB-T2)". Published Jun. 2008.*
(Continued)

*Primary Examiner* — Ayaz Sheikh
*Assistant Examiner* — Tarell Hampton
(74) *Attorney, Agent, or Firm* — The Farrell Law Firm, P.C.

(57) ABSTRACT

A method for transmitting and receiving broadcast signals in a radio broadcasting communication system is provided together with an associated apparatus. The transmitting method includes creating a frame having a preamble slot, a data slot and a control slot, and sending the created frame. The control slot has information for assigning the data slot to one of an uplink and a downlink. The receiving method includes receiving such a frame wherein the control slot has scheduling information for each user, and extracting the data slot from the received frame by using the scheduling information in the control slot. These methods may realize an interactive broadcasting by separately employing broadcast signals for the uplink and downlink.

20 Claims, 9 Drawing Sheets

(51) Int. Cl.
   *H04W 4/06*   (2009.01)
   *H04L 1/00*   (2006.01)
   *H04L 1/16*   (2006.01)
   *H04L 5/00*   (2006.01)
   *H04W 72/00*  (2009.01)

(52) U.S. Cl.
   CPC .......... *H04L 5/0007* (2013.01); *H04L 5/0092* (2013.01); *H04W 4/06* (2013.01); *H04W 72/005* (2013.01)

(56) References Cited

U.S. PATENT DOCUMENTS

| | | | |
|---|---|---|---|
| 2002/0172163 A1* | 11/2002 | Chen et al. | 370/281 |
| 2006/0009200 A1 | 1/2006 | Jung et al. | |
| 2007/0242653 A1* | 10/2007 | Yang et al. | 370/342 |
| 2008/0095253 A1* | 4/2008 | Koga et al. | 375/260 |
| 2008/0137562 A1 | 6/2008 | Li et al. | |
| 2009/0129298 A1* | 5/2009 | Luo et al. | 370/280 |
| 2009/0257421 A1* | 10/2009 | Nakashima et al. | 370/345 |

OTHER PUBLICATIONS

Korean Office Action dated Nov. 27, 2014 issued in counterpart application No. 10-2009-0019474.

* cited by examiner

METHOD AND APPARATUS FOR TWO-WAY BROADCASTING

PRIORITY

This application claims priority under 35 U.S.C. §119(a) to a Korean Patent Application filed in the Korean Intellectual Property Office on Mar. 6, 2009, and assigned Serial No. 10-2009-0019474, the content of which is hereby incorporated by reference.

BACKGROUND OF THE INVENTION

1. Field of the Invention

The present invention relates in general to two-way broadcasting technology and, more particularly, to a method and apparatus for transmitting and receiving broadcast signals in a radio broadcasting communication system while separately establishing the uplink and downlink through the broadcast signals and distinguishing different systems and cells.

2. Description of the Related Art

Today's a broadcasting services utilize digitization, multi-channel, broadband and high quality. With the recent spread of high definition digital TV, a portable multimedia player (PMP) and a portable broadcasting receiver, extensive research is being conducted in order to offer an advanced broadcasting service through various ways in a radio broadcasting communication system.

The Digital Video Broadcasting-Second Generation Terrestrial (DVB-T2) system normally used in Europe has proposed a standard for offering a broadcasting service to a fixed or mobile receiver. In addition, the Digital Video Broadcasting-Next Generation Handheld (DVB-NGH) system is being studied as a standard for a mobile receiver based generally on mobile communication technology. The standardization of the DVB-NGH system is based on physical hierarchy architecture of the DVB-T2 system rather than that of the DVB-Handheld (DVB-H). Therefore, like the DVB-T2 system, the DVB-NGH system can support various channels and various system parameter modes and further guarantee the mobility of a receiver. The DVB-T2 system offers a broadcasting service of various broadcasting channels through a plurality of continuous frames.

Figure 1:
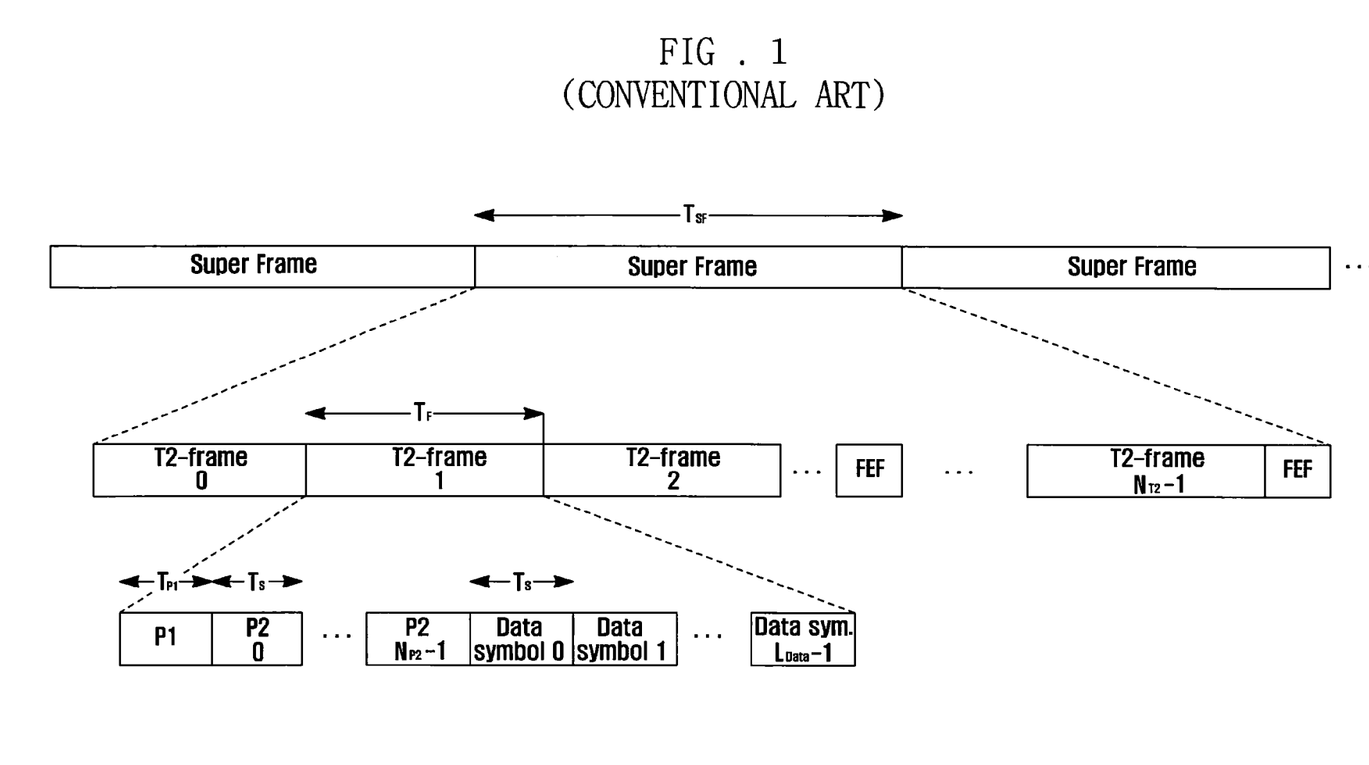
FIG. 1 is a diagram illustrating a frame structure of a conventional DVB-T2 system.

Now, a frame of such a radio broadcasting communication system will be described. FIG. 1 is a diagram illustrating a frame structure of a conventional DVB-T2 system. Referring to FIG. 1, a DVB-T2 frame is composed of a plurality of super frames, each of which includes a plurality of T2 frames. Each T2 frame is composed of preambles and data symbols.

As discussed above, the DVB-NGH system is being standardized depending on physical hierarchy architecture of the DVB-T2 system. Therefore, a way of jointly using the DVB-NGH system and the DVB-T2 system is required in the art.

BRIEF SUMMARY OF THE INVENTION

Accordingly, the present invention is to address at least the above-mentioned problems and/or disadvantages and to provide at least the advantages described below.

An aspect of the present invention is to provide a method and apparatus for transmitting and receiving broadcast signals in a radio broadcasting communication system while separately establishing the uplink and downlink through the broadcast signals.

Another aspect of the present invention is to provide a method and apparatus for transmitting and receiving broadcast signals in a radio broadcasting communication system while distinguishing different systems and cells.

According to one aspect of the present invention, provided is a method for transmitting a broadcast signal for a two-way communication, the method including creating a frame having a preamble slot, a data slot and a control slot wherein the control slot has information for assigning the data slot to one of an uplink and a downlink; and sending the created frame.

According to another aspect of the present invention, provided is a method for receiving a broadcast signal for a two-way communication at user equipment, the method including receiving a frame having a preamble slot, a data slot and a control slot wherein the control slot has scheduling information for each user; and extracting the data slot from the received frame by using the scheduling information in the control slot.

According to still another aspect of the present invention, provided is an apparatus for transmitting a broadcast signal for a two-way communication, the apparatus including a creating unit configured to create a frame having a preamble slot, a data slot and a control slot wherein the control slot has information for assigning the data slot to one of an uplink and a downlink; and a sending unit configured to send the created frame.

According to yet another aspect of the present invention, provided is an apparatus for receiving a broadcast signal for a two-way communication, the apparatus including a receiving unit configured to receive a frame having a preamble slot, a data slot and a control slot wherein the control slot has scheduling information for each user; and an extracting unit configured to extract the data slot from the received frame by using the scheduling information in the control slot.

Therefore, a broadcasting system according to aspects of the present invention may realize an interactive broadcasting by separately employing broadcast signals for the uplink and downlink. Also, aspects of this invention may allow transmitting and receiving broadcast signals while distinguishing different systems and cells in a radio broadcasting system which is based on a cellular system and may contain at least two different systems.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 2:
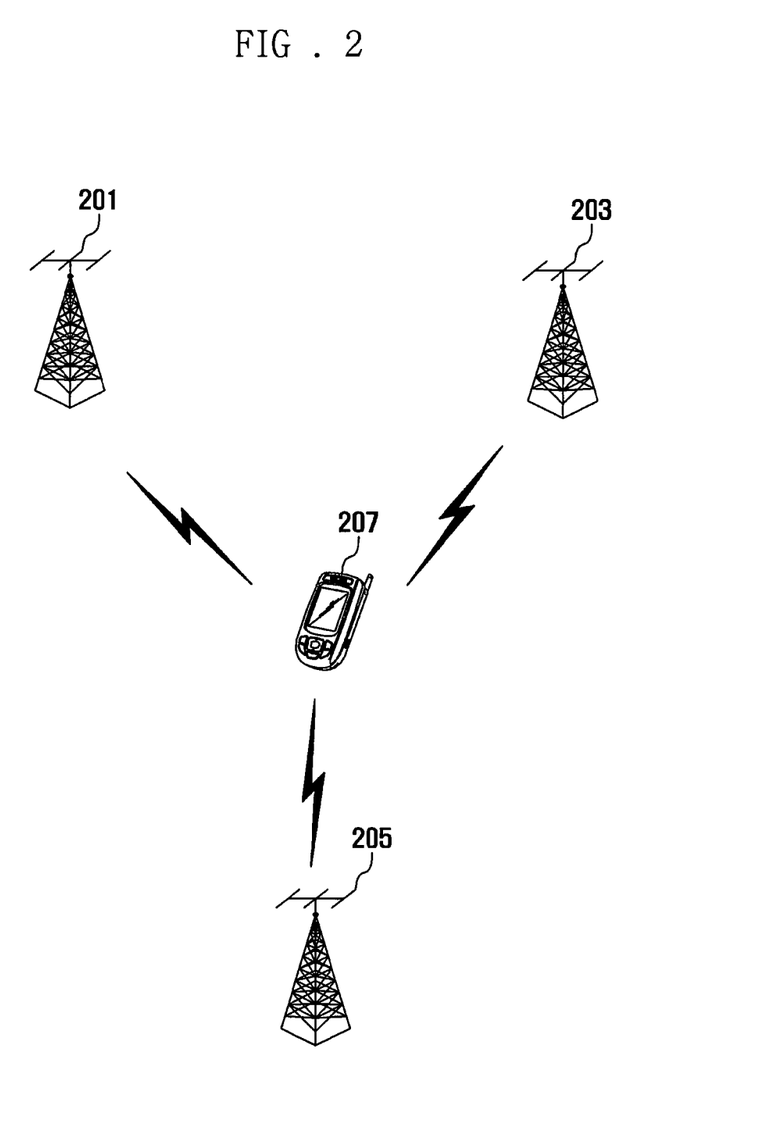
FIG. 2 is a diagram illustrating a radio broadcasting system in accordance with an embodiment of the present invention.

A radio broadcasting system will be described. FIG. 2 is a diagram illustrating a radio broadcasting system in accordance with an embodiment of the present invention.

Referring to FIG. 2, the radio broadcasting system according to an embodiment of the invention is normally based on a cellular system. This radio broadcasting system includes base stations 201, 203 and 205 which use at least one of the DVB-T2 system and the DVB-NGH system, and user equipment 207 which receives broadcast signals from a serving base station among such base stations 201, 203 and 205 according to at least one of DVB-T2 and DVB-NGH technologies.

In this radio broadcasting system based on a cellular system, the present invention allows the user equipment 207 to distinguish a base station (or a cell), to perceive the kind of system technology, namely, the DVB-T2 technology and the DVB-NGH technology, and thereby to receive broadcast signals. Also, the present invention offers a broadcasting system available for a two-way communication rather than a normal one-way communication.

Figure 3:
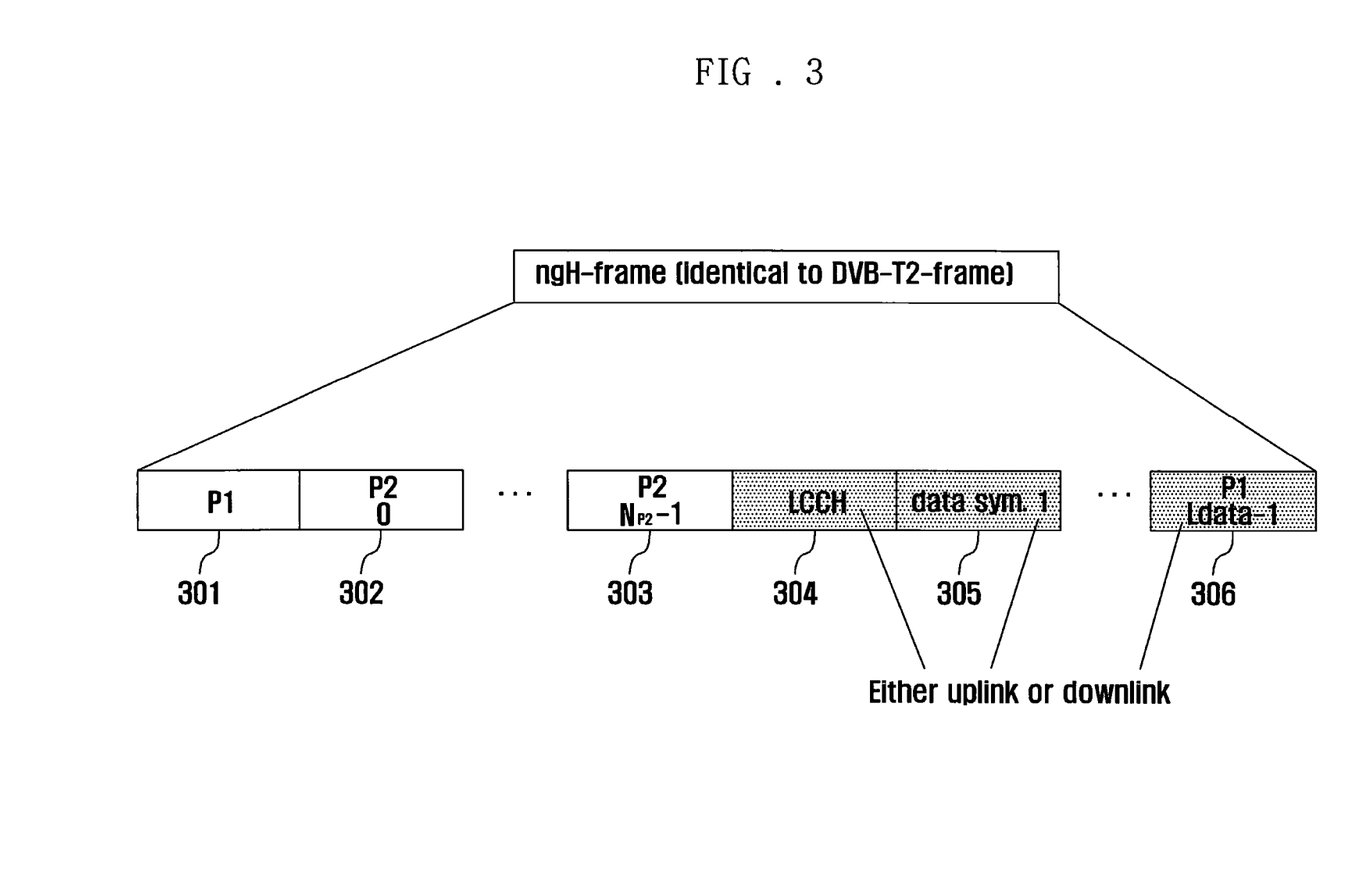
FIG. 3 is a diagram illustrating a frame structure in accordance with an embodiment of the present invention.

Now, a frame structure will be described in detail. FIG. 3 is a diagram illustrating a frame structure in accordance with an embodiment of the present invention.

As discussed above, DVB-T2 and DVB-NGH technologies are based on a cellular system. In addition, DVB-T2 and DVB-NGH technologies are further based on a Single Frequency Networking (SFN) scheme. The SFN scheme is to use a single carrier in transmission and reception of signals. Particularly, a frame structure is designed in consideration of a two-way communication instead of a one-way communication in a normal broadcasting. In order to realize a two-way communication by using a single carrier, Time Division Duplex (TDD) technique may be considered. That is, transmission resources may be divided by time and separately used for the downlink and the uplink. Besides, different transmitter sections may permit a coarse timing synchronization scheme.

A transmission signal for DVB-T2 and DVB-NGH includes a plurality of frames which are logically separated. These frames are composed of time slots. A single symbol of Orthogonal Frequency Division Multiplexing (OFDM) is mapped with each time slot. That is, a frame and a slot may be regarded as the same time concept and therefore will be used together hereinafter.

A super frame is composed of a plurality of frames which are mapped with a single OFDM symbol. FIG. 3 shows one frame forming a super frame. Referring to FIG. 3, a frame in a broadcasting communication system according to an embodiment of the present invention includes preamble frames 301, 302 and 303 used as preambles, data frames 305 and 306 used for data transmission, and a Leash Control Channel (LCCH) frame 304.

In order to realize a two-way communication, the LCCH frame 304 employs at least one of conventional data frames. The LCCH frame 304 is used for the purpose of information signaling. That is, the LCCH frame 304 is considered to be a control channel.

The LCCH frame 304 contains control information required for the execution of a two-way communication. The LCCH frame 304 has information indicating whether the data frames 305 and 306 are used for the uplink or for the downlink. Therefore, the LCCH frame 304 and the data frames 305 and 306 may be formed as frames for the uplink or the downlink. Normally since more data is delivered from a transmitter than from a receiver, more frames (or slots) may be used for the downlink than for the uplink.

Table 1 is an example of information delivered through the LCCH frame according to an embodiment of the present invention. Such information is generally referred to as User and Service Specific LCCH Information (USSLI) and will be hereinafter referred shortly to as LCCH information.

TABLE 1

| User number (UN) | Link quality (LQI) | ARQ SN | ARQ RN | ARQ parameters | Data slots used | Service number (SN) | Service type (ST) | LCCH data for the used service |
|---|---|---|---|---|---|---|---|---|

Referring to Table 1, the LOCH information according to an embodiment of this invention includes a User Number (UN) field, a Link Quality (LQI) field, an Automatic Retransmission Request Sequence Number (ARQ SN) field, an ARQ Request Number (ARQ RN) field, an ARQ parameters field, a data slots used field, a Service Number (SN) field, a Service Ttype (ST) field, and an LCCH data for used service field.

The UN field has a size of four octets (or bytes) and records identification information for identifying each user. The UN field may be used to identify users to the number of 65536.

The LQI field has a size of two octets and is used to identify a link quality.

The ARQ SN field has a size of two octets and records a sequence number for ARQ of a signal the current user equipment receives.

The ARQ RN field has a size of two octets and records a request number for ARQ. The ARQ RN field may be obtained from the above sequence number.

The ARQ parameters field has a size of two octets and records ARQ parameters for ARQ.

The data slots used field has a size of two octets and records information indicating which data frame complies with the LCCH information assigned to each service. In other words, the data slots used field contains information which indicates a specific data frame used according to the LCCH information delivered.

The SN field has a size of two octets and records a service number.

The ST field has a size of two octets and is used to identify a service type.

The LCCH data for used service field has a size of fourteen octets and records control information related to a service. For instance, this field contains information indicating or requesting which data frame is to be used for the downlink or for the uplink.

As discussed heretofore, each of the LCCH information consists of thirty two octets which correspond to 256 bits.

Figure 4A:
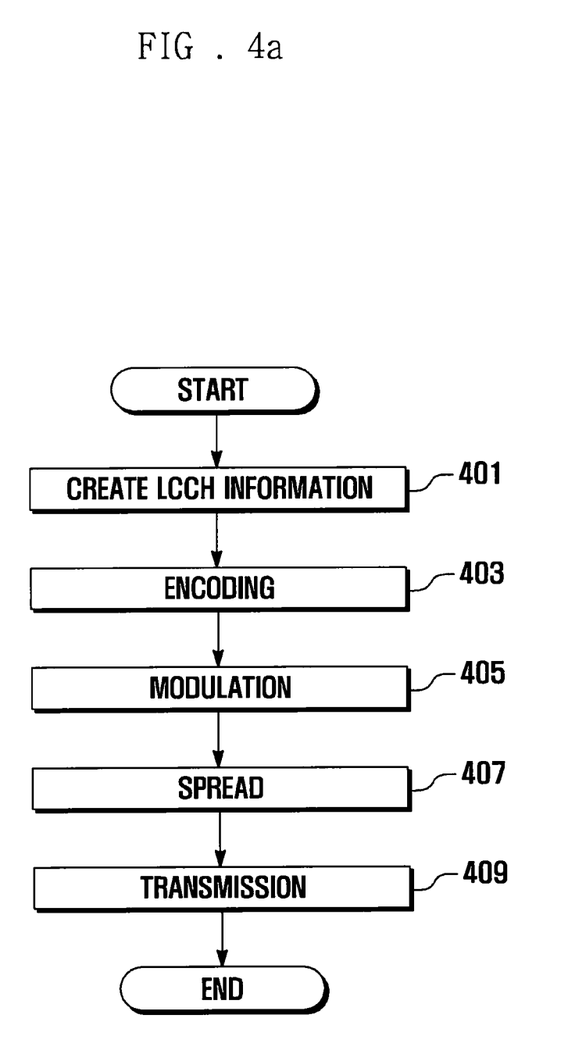
FIGS. 4A and 4B are flow diagrams which illustrate a method for transmitting a broadcast signal in accordance with an embodiment of the present invention.
Figure 4B:
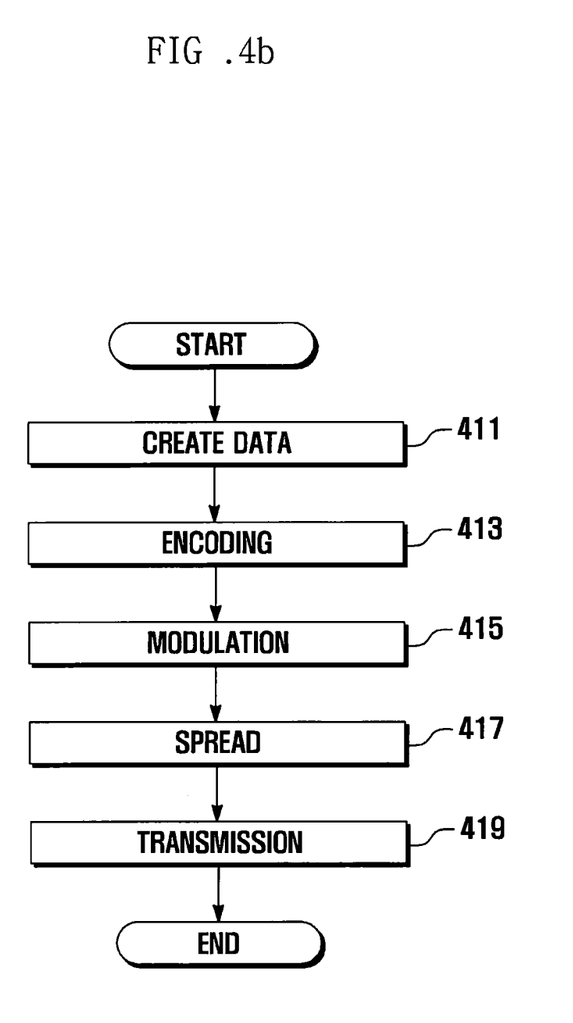

A method for transmitting a broadcast signal having the LCCH information according to an embodiment of this invention will be described. FIGS. 4A and 4B are flow diagrams which illustrate a method for transmitting a broadcast signal in accordance with an exemplary embodiment of the present invention.

First, a method for sending the LCCH information will be described with reference to FIG. 4A. In this embodiment, let's suppose that a transmission and reception system employs PP7, 32 k Fast Fourier Transform (FFT) and 256 Quadrature Amplitude Modulation (QAM).

Referring to FIG. 4A, the base station creates the LCCH information in step 401. That is, the base station creates a service number, a service type, and LCCH information by a service number of each user. Each LCCH frame may contain LCCH information (USSLI structure) to the number of 419. Therefore, each LCCH frame may contain 13408 octets which correspond to 107264 bits.

Next, the base station performs a channel encoding for the LCCH information at a code rate of 107264 bits over 214688 bits (about 0.4996) in step 403.

Next, the base station modulates coded data in step 405. Preferably, the LCCH information may be modulated through 256-QAM technique in consideration of 26836 cells.

These cells may be mapped with subcarriers available for 32 k OFDM symbols. For such reasons, the base station spreads data modulated using 32 k point Inverse Fast Fourier Transform (IFFT) in step 407 and sends the spread data in step 409.

Alternatively, Inverse Discrete Fourier Transform (IDFT), especially IDFT matrix D, may be used instead of 32 k point IFFT. Also, in the case where Fast Frequency Hopping (FFH) pattern is used, FFH/OFDM matrix D may be alternatively used.

The allocation of data symbols to subcarriers is carried out by using frames allocated depending on the aforesaid LCCH information. A method for sending data will be described with reference to FIG. 4B.

Referring to FIG. 4B, the base station creates data according to a service number and a service type by a service number of each user in step 411.

Next, the base station performs a channel encoding for the LCCH information at a code rate of 107264 bits over 214688 bits (about 0.4996) in step 413.

Next, the base station modulates coded data in step 415. Preferably, the LCCH information may be modulated through 256-QAM technique in consideration of 26836 cells.

These cells may be mapped with subcarriers available for 32 k OFDM symbols. For such reasons, the base station spreads data modulated using 32 k point IDFT in step 417 and sends the spread data in step 419.

OFDM symbols are created using spreading codes for the LCCH information and data. According to an embodiment of this invention, the spread through such spreading codes may be performed using scrambling codes (or sequences) capable of distinguishing respective cells and systems. A cell specific scrambling scheme which allows macro diversity and is used to distinguish DVB-T2 and DVB-NGH systems is provided.

Figure 5:
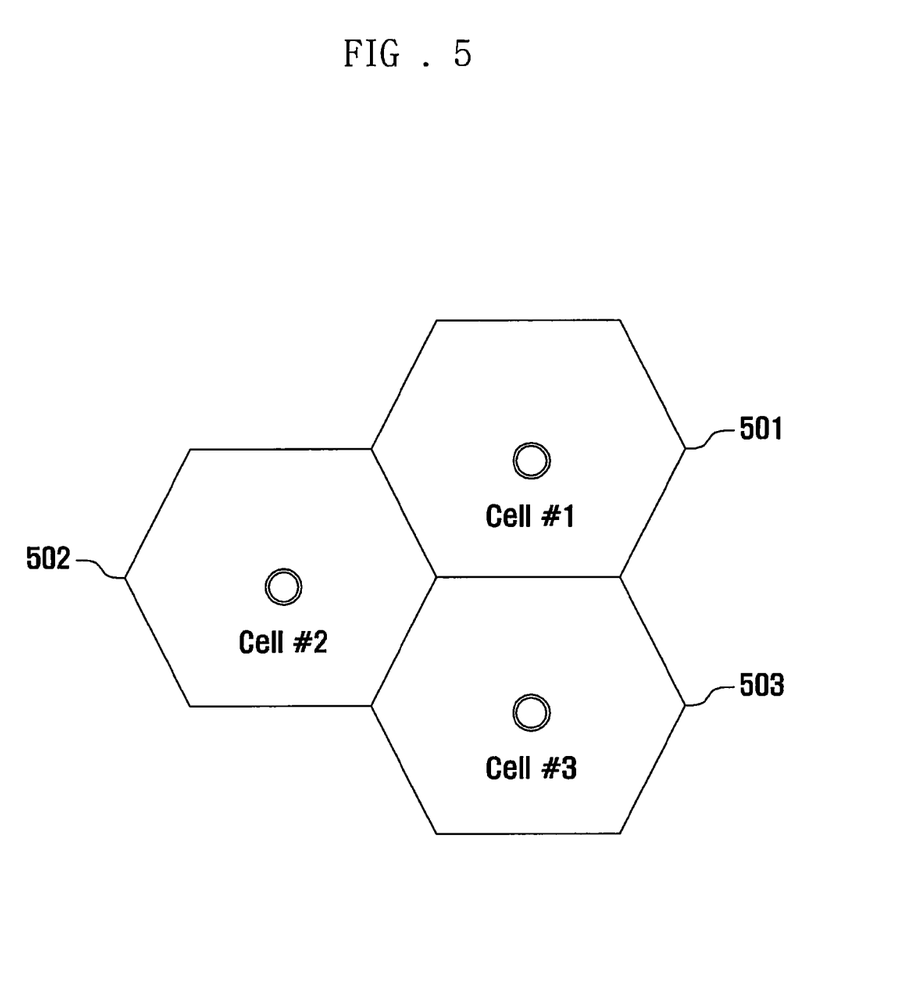
FIG. 5 is a diagram illustrating a cell cluster to which a cell specific scrambling scheme is applied in accordance with an embodiment of the present invention.

FIG. 5 is a diagram illustrating a cell cluster to which a cell specific scrambling scheme is applied in accordance with an embodiment of the present invention.

Referring to FIG. 5, a cell cluster is a group of base stations each of which provides a service based on at least one of DVB-T2 and DVB-NGH. In this example, one cluster has three cells.

As shown in FIG. 5, the first, second and third cells 501, 502 and 503 constitute one cell cluster. Each cell corresponds to a base station which provides a broadcasting service based on at least one of DVB-T2 and DVB-NGH.

By using scrambling codes for distinguishing the cells in the cluster, each cell 501, 502 and 503 comes to have a specific number of 1, 2 or 3 at a cell parameter c. Additionally, in order to perceive the kind of DVB system, namely, to determine whether the system used is based on DVB-T2 or DVB-NGH, different codes may be assigned. In this embodiment, $c_T^{(c)}$ is used for DVB-T2 and one of 1, 2 and 3 is given at an affix (c) to identify each cell. Similarly, $c_H^{(c)}$ is used for DVB-NGH and one of 1, 2 and 3 is given at an affix (c) to identify each cell. As a result, if one cluster is composed of three cells, six codes are used according to cell numbers and system types.

Each scrambling code is repeated at each time slot processed in a receiver. Therefore, such scrambling codes are required to correspond to samples of each time slot.

Figure 6:
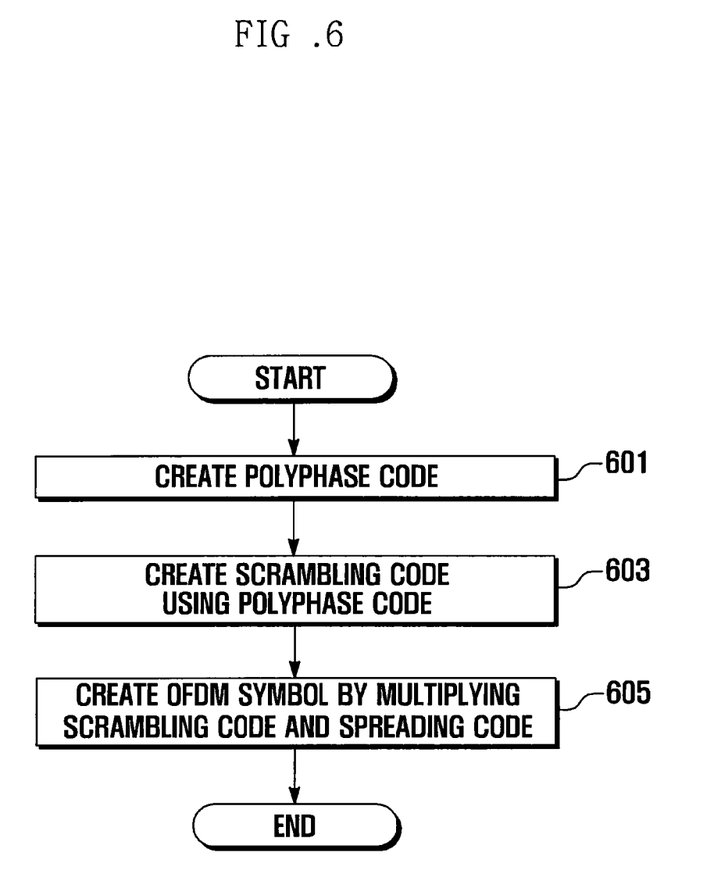
FIG. 6 is a flow diagram which illustrates a method for creating a scrambling code in accordance with an embodiment of the present invention.

A method for creating such scrambling codes will be described. FIG. 6 is a flow diagram which illustrates a method for creating a scrambling code in accordance with an y embodiment of the present invention.

In this example, the size of the FFT is represented as $N_{FFT}$, P7 is used, and the size of $N_{FFT}$ is 32 k.

Referring to FIG. 6, the base station creates a polyphase code m in step 601. A polyphase code is composed of six $N_{FFT}$ code elements each of which has 256 phases.

Next, the base station creates a scrambling code for each system and cell by using the above polyphase code in step 603.

Equation (1) represents the creation of scrambling codes for respective systems and cells.

$$c_T^{(1)} = ([m]_1, [m]_2, K, [m]_{N_{FFT}})^T$$

$$c_T^{(2)} = ([m]_{N_{FFT}+1}, [m]_{N_{FFT}+2}, K, [m]_{2N_{FFT}})^T$$

$$c_T^{(3)} = ([m]_{2N_{FFT}+1}, [m]_{2N_{FFT}+2}, K, [m]_{3N_{FFT}})^T$$

$$c_H^{(1)} = ([\underline{m}]_{3N_{FFT}+1}, [\underline{m}]_{3N_{FFT}+2}, K, [\underline{m}]_{4N_{FFT}})^T$$

$$c_H^{(2)} = ([\underline{m}]_{4N_{FFT}+1}, [\underline{m}]_{4N_{FFT}+2}, K, [\underline{m}]_{5N_{FFT}})^T$$

$$c_H^{(3)} = ([\underline{m}]_{5N_{FFT}+1}, [\underline{m}]_{5N_{FFT}+2}, K, [\underline{m}]_{6N_{FFT}})^T \quad (1)$$

In the frequency domain, a spreading process is performed by multiplying a multiplication factor and each code element. This spreading process is an IDFT process in a transmitter section and a DFT process in a receiver section. Therefore, a spreading matrix (N*N IDFT matrix, $\underline{D}$) may be represented as in Equation (2).

$$[\underline{D}]_{v,\mu} = \frac{1}{\sqrt{N_{FFT}}} \exp\left\{ j2\pi(v-1)\frac{\mu-1}{N_{FFT}} \right\} \quad (2)$$

A spreading matrix shown in Equation (2) has v rows and μ columns. Each column corresponds to a subcarrier, and each row corresponds to a sample time constant.

Next, the base station creates an OFDM symbol by multiplying the scrambling code and the above-discussed spreading code while performing a spread by using the spreading codes in step 605.

In an embodiment of this invention, multiplied together are a matrix shown in Equation (2) and a scrambling code for identifying a system type (i.e., T2 or NGH) and a cell (the first, second, or third cell) as shown in Equation (1).

Specifically, in the case of DVB-T2, a matrix $\underline{D}_{sT}$ for distinguishing DVB-T2 is created by in Equation (3) by multiplying a scrambling code.

$$[\underline{D}_{sT}]_{v,\mu} = [\underline{c}_T^{(c)}]_\mu \cdot \frac{1}{\sqrt{N_{FFT}}} \exp\left\{ j2\pi(v-1)\frac{\mu-1}{N_{FFT}} \right\}, \quad (3)$$

$$c = 1, 2, 3,$$

On the other hand, in the case of DVB-NGH, a matrix $\underline{D}_{sH}$ for distinguishing DVB-NGH is created by Equation (4) by multiplying a scrambling code.

$$[\underline{D}_{sH}]_{v,\mu} = [\underline{c}_H^{(c)}]_\mu \cdot \frac{1}{\sqrt{N_{FFT}}} \exp\left\{ j2\pi(v-1)\frac{\mu-1}{N_{FFT}} \right\}, \quad (4)$$

$$c = 1, 2, 3.$$

As discussed above, a process of spreading transmission signals may include scrambling codes which allow distinguishing systems and cells.

Figure 7:
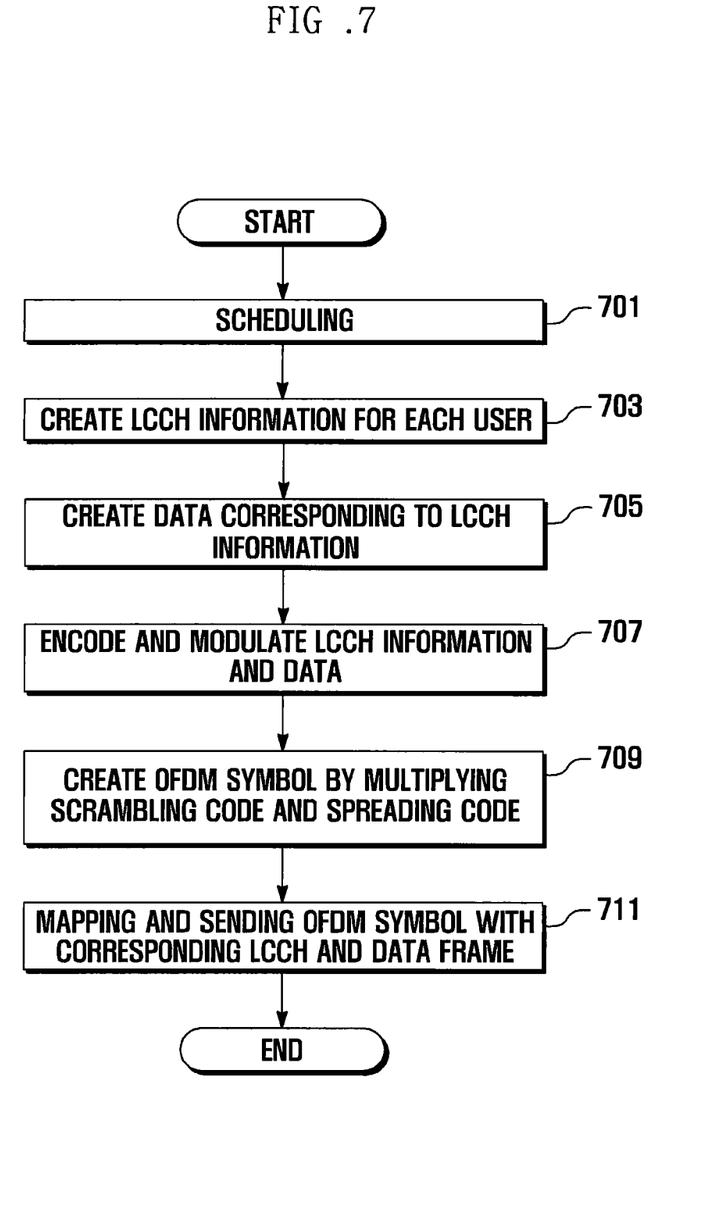
FIG. 7 is a flow diagram which illustrates a method for transmitting a broadcast signal in accordance with an embodiment of the present invention.

A method for sending broadcast signals will be described. FIG. 7 is a flow diagram which illustrates a method for transmitting a broadcast signal in accordance with an embodiment of the present invention.

Referring to FIG. 7, the base station performs a scheduling for identifying frames used to send broadcast signals in step 701. As discussed above in FIG. 3, the base station distinguishes the preamble frames 301, 302 and 303, the data frames 305 and 306, and the LCCH frame 304. Additionally, the base station determines whether the LCCH frame and the data frames will be used for the uplink or for the downlink.

Depending on the result of a scheduling, the base station creates LCCH information for each user in step 703. The LCCH information includes information about allocating transmission resources (namely, uplink and downlink) according to the result of a scheduling.

The base station creates data corresponding to the LCCH information for each user in step 705.

The base station encodes and modulates the LCCH information and corresponding data in step 707.

The base station creates an OFDM symbol by multiplying the scrambling code for identifying both a system type (i.e., T2 or NGH) and a cell by the spreading code of encoded and modulated LCCH information and data in step 709.

The base station performs a mapping of a created OFDM symbol with corresponding LCCH and the data frames and then transmits them in step 711.

Figure 8:
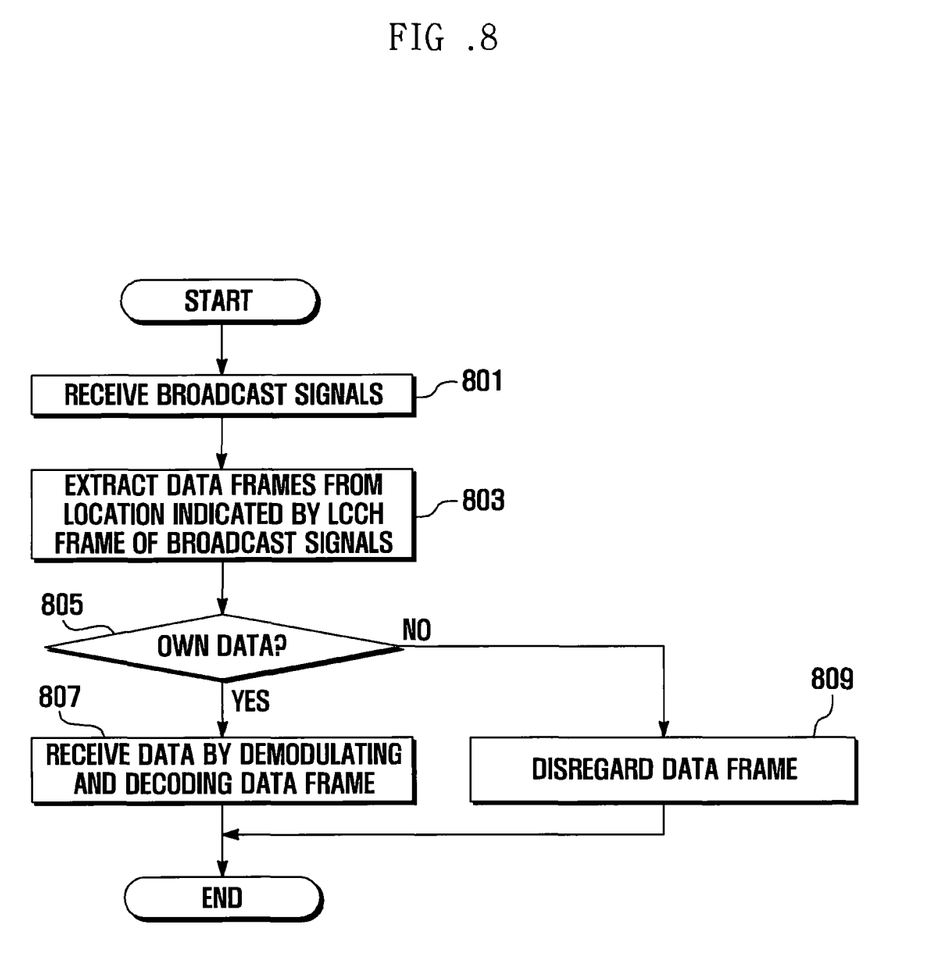
FIG. 8 is a flow diagram which illustrates a method for receiving a broadcast signal in accordance with an embodiment of the present invention.

A method for receiving broadcast signals will be described. FIG. 8 is a flow diagram which illustrates a method for receiving a broadcast signal in accordance with an embodiment of the present invention.

Referring to FIG. 8, the user equipment receives broadcast signals in step 801. As discussed above, such a broadcast signal contains the preamble frames 301, 302 and 303, the data frames 305 and 306, and the LCCH frame 304.

When receiving broadcast signals, the user equipment adjusts the sync with its own serving base station through the preamble frames and then receives the LCCH frames. Since the LCCH frame contains scheduling information for each user, the user equipment can know its own transmission resources through such LCCH information. Transmission resources indicate the location of data frames assigned to the user equipment and also indicate whether data frames will use the uplink and downlink.

Then the user equipment extracts data frames from the corresponding location indicated by the LCCH frame of broadcast signals in step 803.

By multiplying the scrambling code and the extracted data frames, the user equipment ascertains whether the extracted data frames are its own in step 805. The scrambling code has system and cell numbers of a serving base station associated with the user equipment. Therefore, by multiplying the scrambling code according to a system type and a cell number of its own serving base station in a cluster, the user equipment can determine whether the extracted data frames are its own or not.

If the data frames are its own, the user equipment receives data by demodulating and decoding the data frames in step 807. Although 256-QAM is used for modulation and demodulation in this embodiment, any other modulation/demodulation technique may also be used.

On the other hand, if the data frames are not its own, the user equipment disregards the data frames in step 809.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for transmitting a broadcast signal for a two-way communication, the method comprising:
    creating, by a creating unit, a frame having at least one preamble slot, at least one data slot and at least one control slot; and
    transmitting, by a sending unit, the created frame,
    wherein the at least one control slot contains information indicating or requesting which of the at least one data slot is to be used for an uplink or a downlink,
    wherein the at least one data slot contains an orthogonal frequency division multiplexing (OFDM) symbol, and wherein the OFDM symbol is generated for distinguishing respective broadcasting systems by using a scrambling code.

2. The method of claim 1, wherein the at least one control slot further includes at least one of information identifying a user, information identifying a link quality, an automatic retransmission request sequence number (ARQ SN), an ARQ request number (ARQ RN), an ARQ parameters, information indicating a data slot complying with a control slot, a service number (SN), and information identifying a service type (ST).

3. The method of claim 1, wherein creating of the frame includes:
allocating control information to the at least one control slot; and
allocating a data symbol to the at least one data slot according to the control information.

4. The method of claim 3, wherein transmitting of the created frame includes:
encoding the created frame;
modulating the encoded frame;
spreading the modulated frame; and
transmitting the spread frame.

5. The method of claim 4, wherein spreading of the modulated frame includes:
creating a polyphase code;
creating the scrambling code using the polyphase code; and
creating the OFDM symbol by multiplying the created scrambling code and a spreading code.

6. A method for receiving a broadcast signal for a two-way communication at user equipment, the method comprising:
receiving, by a receiving unit, a frame having at least one preamble slot, at least one data slot and at least one control slot wherein the at least one control slot contains scheduling information for each user;
extracting, by an extracting unit, the at least one data slot from the received frame by using the scheduling information in the at least one control slot; and
determining, by a first unit, whether the at least one extracted data slot is assigned to the user equipment, by multiplying a scrambling code and the at least one extracted data slot,
wherein the at least one control slot further contains information indicating or requesting which of the at least one data slot is to be used for an uplink or a downlink and information identifying a service type, and
wherein the scrambling code corresponds to a specific broadcasting system.

7. The method of claim 6, further comprising:
if the at least one extracted data slot is assigned to the user equipment, receiving, by a second unit, data by demodulating and decoding the at least one extracted data slot.

8. The method of claim 6, further comprising:
if the at least one extracted data slot is not assigned to the user equipment, disregarding, by a third unit, the at least one extracted data slot.

9. An apparatus for transmitting a broadcast signal for a two-way communication, the apparatus comprising:
a creating unit configured to create a frame having at least one preamble slot, at least one data slot and at least one control slot; and
a sending unit configured to transmit the created frame,
wherein the at least one control slot contains information indicating or requesting which of the at least one data slot is to be used for an uplink or a downlink,
wherein the at least one data slot contains an orthogonal frequency division multiplexing (OFDM) symbol, and
wherein the OFDM symbol is generated for distinguishing respective broadcasting systems by using a scrambling code.

10. The apparatus of claim 9, wherein the at least one control slot further includes at least one of information identifying a user, information identifying a link quality, an automatic retransmission request sequence number (ARQ SN), an ARQ request number (ARQ RN), an ARQ parameters, information indicating a data slot complying with a control slot, a service number, and information identifying a service type (ST).

11. The apparatus of claim 9, wherein the creating unit is further configured to allocate control information to the at least one control slot and also to allocate a data symbol to the at least one data slot according to the control information.

12. The apparatus of claim 11, wherein the sending unit is further configured to encode the created frame, to modulate the encoded frame, to spread the modulated frame, and to transmit the spread frame.

13. The apparatus of claim 12, wherein the sending unit is further configured to create a polyphase code, to create the scrambling code using the polyphase code, and to create the OFDM symbol by multiplying the created scrambling code and a spreading code.

14. An apparatus for receiving a broadcast signal for a two-way communication, the apparatus comprising:
a receiving unit configured to receive a frame having at least one a preamble slot, at least one data slot and at least one control slot wherein the at least one control slot contains scheduling information;
an extracting unit configured to extract the at least one data slot from the received frame by using the scheduling information in the at least one control slot; and
a first unit configured to determine whether the at least one extracted data slot is assigned to user equipment, by multiplying a scrambling code and the at least one extracted data slot,
wherein the at least one control slot further contains information indicating or requesting which of the at least one data slot is to be used for an uplink or a downlink and information identifying a service type, and
wherein the scrambling code corresponds to a specific broadcasting system.

15. The apparatus of claim 14, further comprising:
a second unit configured to receive data by demodulating and decoding the at least one extracted data slot if the at least one extracted data slot is assigned to the user equipment.

16. The apparatus of claim 14, further comprising:
a third unit configured to disregard the at least one extracted data slot if the at least one extracted data slot is not assigned to the user equipment.

17. The method of claim 1, wherein the broadcasting systems comprise at least one of digital video broadcasting-second generation terrestrial (DVB-T2) system and digital video broadcasting-next generation handheld (DVB-NGH) system.

18. The method of claim 6, wherein the specific broadcasting system comprises at least one of digital video broadcasting-second generation terrestrial (DVB-T2) system and digital video broadcasting-next generation handheld (DVB-NGH) system.

19. The apparatus of claim 9, wherein the broadcasting systems comprise at least one of digital video broadcasting-second generation terrestrial (DVB-T2) system and digital video broadcasting-next generation handheld (DVB-NGH) system.

20. The apparatus of claim 14, wherein the specific broadcasting system comprises at least one of digital video broadcasting-second generation terrestrial (DVB-T2) system and digital video broadcasting-next generation handheld (DVB-NGH) system.

* * * * *